United States Patent Office 3,361,585
Patented Jan. 2, 1968

3,361,585
WATER RESISTANT ADHESIVES BASED ON ACETOACETATE ESTERS OF STARCH
Walter B. Armour, Plainfield, and Dilip Kumar Ray-Chaudhuri, Westfield, N.J., assignors to National Starch and Chemical Corporation, New York, N.Y., a corporation of Delaware
No Drawing. Filed Aug. 18, 1965, Ser. No. 480,807
12 Claims. (Cl. 106—210)

ABSTRACT OF THE DISCLOSURE

Adhesive compositions comprising the products resulting from the admixture of an aldehyde curing agent and an aqueous dispersion of an acetoacetate ester of starch, the adhesive compositions being characterized by the optimum water resistance and high strength of the adhesive bonds derived therefrom.

This invention relates to the preparation of novel, water resistant, rapid setting starch based adhesive compositions and to the adhesives thus prepared.

Starch based adhesives, comprising aqueous dispersions of starch and their derivatives, are widely used in commercial practice. However, the bonds derived from such adhesives are often inherently poor with respect to their water resistance. The latter deficiency has proven to be a serious drawback inasmuch as resistance to water or water vapor is required in adhesive bonds which are to be exposed to moisture in ordinary usage or which may be exposed to the excessive moisture and varying temperature conditions encountered during outdoor exposure. Attempts to increase the water resistance of starch based adhesives have centered on the addition of resin-catalyst systems to the aqueous dispersions. Although such additives have improved the water resistance of the resulting bonds, their use has in turn created other problems relating to economy, pot life, flow properties, and machine speeds, etc.

It is the object of this invention to provide stable, starch based compositions capable of yielding adhesive bonds which exhibit optimum water resistance and high strength. A further object of this invention involves the preparation of starch based adhesives which are characterized by their ability to rapidly set at elevated temperatures and which are, thus, suitable for diverse industrial applications. Other objects will become apparent to the practitioner during the course of this disclosure.

We have now discovered adhesive systems capable of yielding exceedingly water resistant bonds; these novel systems being produced by dispersing an acetoacetate ester of starch in water and thereupon adding an aldehyde curing agent to the resulting dispersions immediately prior to their utilization. The acetoacetate esters of starch have been found to be ideally suited for use in the adhesive compositions of this invention inasmuch as they contain active methylene groups which can readily participate in a crosslinking reaction with the aldehyde curing agent.

The acetoacetate esters of starch utilizable in the adhesive compositions of this invention correspond to the formula

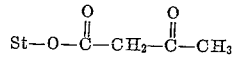

wherein St represents the starch molecule. A detailed description of these starch esters and their method of preparation may be found in our copending application, Ser. No. 474,447, filed July 23, 1965, which application is fully incorporated herein. However, it may be briefly noted that these novel acetoacetate esters may be prepared by reacting starch with diketene at controlled temperatures and pH levels, in either aqueous or non-aqueous media, and in the presence of selected catalysts. Thus, the starches which may be utilized as base materials in this reaction include raw starches, dextrines, oxidized starches, thin boiling starches, amylose and amylopectin fractions of starch, starch ethers, and starch esters, etc. When conducting the above reaction in aqueous media, either acidic catalysts such as sulfuric acid and phosphoric acid or basic catalysts such as the alkali metal hydroxides, alkaline-earth hydroxides and quaternary ammonium bases may be utilized. On the other hand, when conducting the reaction in such non-aqueous media as pyridine, picoline, dimethylformamide, and acetic acid, acidic catalysts such as sulfuric acid, perchloric acid and benzene sulfonic acid or basic catalysts such as tertiary amines may be utilized in conjunction with the proper solvents.

It should be noted that although the acetoacetate esters of starch may contain an acetoacetyl content as high as about 61.5%, by weight, for purposes of this invention, these derivatives should have an acetoacetyl content ranging from about 3 to 20%, as based on the total weight of the starch derivative. Thus, adhesive compositions prepared from acetoacetate esters containing less than about 3%, by weight, of acetoacetyl groups show inadequate water resistance. On the other hand, it is difficult to prepare functional adhesive compositions from esters containing more than about 20%, by weight, of acetoacetyl groups primarily because such starch esters are not readily dispersible in water. In addition, their use is often accompanied by premature crosslinking.

There is a slight tendency for the dispersed starch ester to settle out of the water dispersion. Thus, in order to retard or eliminate the latter tendency it may be desirable to include a protective colloid such as gelatinized starch, a starch derivative or other material in the novel adhesive compositions of this invention. It should be noted, however, that the presence of these stabilizing agents is not an absolute requirement and that the adhesive compositions prepared without these stabilizing agents perform equally as well as those which have been stabilized. The gelatinized starch and the starch derivatives which are applicable for use as stabilizing agents may be prepared from any available starch base. In addition to gelatinized starch, other starch derivatives applicable for use as protective colloids include carboxy methyl starch, hydroxyethyl starch, and hydroxypropyl starch, while other protective colloids such as polyvinyl alcohol, methyl cellulose, and hydroxyethyl cellulose may also be utilized.

The addition of an aldehyde curing agent is required in order to crosslink the acetoacetylated starch derivative via its active methylene group and thereby accelerate the cure of the resulting adhesive compositions. Thus, these curing agents facilitate the curing or crosslinking of the adhesive coating or films derived from the adhesive compositions of this invention, thereby enhancing their water resistance. Applicable curing agents are aldehydes and aldehyde progenitors selected from the group consisting of aliphatic aldehydes such as formaldehyde, acetaldehyde, glyoxal, and crotonaldehyde; aromatic aldehydes such as benzaldehyde, anisaldehyde and salicylaldehyde; cyclic aldehydes such as furfural; polymeric aldehydes such as dialdehyde starch; methylol compounds such as dimethylol urea and 2,4,6-trimethylol phenol and cyclic ureides such as dimethylolhydantoin and allantoin. For purposes of this invention, these curing agents are all, hereinafter, referred to as "aldehyde curing agents."

With regard to proportions, the initial starch dispersion should contain from about 20 to 45%, by weight, of the acetoacetate starch ester. If protective colloids are utilized in the formulation, they may be substituted for a maximum of about 25%, by weight, of the starch ester content. The concentration of aldehyde curing agent utilized should range from about 0.3 to 10.0%, as based on the total weight of starch in the adhesive formulation, i.e. the total weight of the acetocetate starch ester plus the weight of any starch based protective colloid. The resulting adhesive formulations thus contain total solids concentrations ranging from about 20 to 50%, by weight.

In preparing the adhesive compositions of this invention, it is merely necessary to first disperse the acetoacetate starch ester in water. If a protective colloid is utilized in the formulation, the latter is initially dissolved in the water and the starch ester is thereupon dispersed in the stabilized solution. No heat or other special treatment is ordinarily required for this operation. The aldehyde curing agents may be added to the resulting starch dispersion at the time the latter formulation is to be utilized, or, if added earlier, they should be introduced no sooner than about 8 hours prior to such utilization.

The resulting adhesive compositions exhibit excellent tack and rapid setting speeds. These properties, together with the excellent and prolonged water resistance exhibited by the bonds derived from these adhesive compositions, are clearly indicative of the potential versatility of the adhesive systems of this invention.

The adhesive compositions of this invention may be applied to the surfaces being bonded by any of the various procedures known to the art, including brush or roller coating as well as spraying. These compositions are usually deposited in coatings having wet films thicknesses ranging from about 3 to 10 mils. Curing is accomplished by exposure to elevated temperatures. Thus, applicable curing procedures may comprise radio frequency curing for periods of from about 10 to 20 seconds; or, hot press curing wherein the temperature and pressure considerations as well as length of the curing period is dependent on the substrate, its thickness and the heat required in order to gelatinize the starch ester particles. In preparing 3 ply, ⅜" thick plywood, a typical curing cycle may thus comprise heating at 250° F. for a period of 5 minutes.

Our adhesives may be used in the bonding, saturation or lamination of many types of porous substrates, such as wood, tempered hardboard, textiles, leather, paper, cement asbestos board and related products, as well as for the manufacture of such products as plywood and wood particle board. One application for which our adhesives have proven to be particularly useful is for the bonding of so-called "finger joints." These finger joints are employed in the lumber industry where it is desirable to make use of the smaller sections of wood that would normally be impractical to use. This can now be accomplished by joining these smaller sections with adhesives and a common procedure for this purpose involves the cutting of the mating edges of the lumber into interlocking fingers which are subsequently glued together.

Another interesting application for our adhesives involves their use in the construction of laminated beams for arches and other supporting structures wherein lumber is laminated so as to obtain the desired dimensions of the final beam. Our adhesive may also be used in the construction of so-called "curtain wall panels." These panels comprise prefabricated wall panels which are made by binding skin materials such as cardboard, plywood, glass and asbestos board, etc. to cores such as foamed plastics, honeycomb cores, insulation board and particle board, etc.

It may also be noted, at this point, that additives such as extenders, preservatives, and other conventional adhesive formulating ingredients may be included in the adhesive compositions of this invention if desired by the practitioner. Included amongst such additives are diatomaceous earths, aluminum silicate pigments, attapulgus clays, and calcium carbonate, etc.

The following examples will further illustrate the embodiment of this invention. In these examples all parts given are by weight unless otherwise noted.

*Example I*

This example illustrates the preparation of an adhesive composition typical of the products of this invention.

The following ingredients were utilized in preparing the adhesive formulation of this example:

| | Parts |
|---|---|
| Acetoacetate ester of corn starch containing 3%, by weight, of acetoacetyl groups | 40 |
| Water | 60 |
| Aqueous solution containing 30%, by weight, of dimethylol urea | 3 |

The starch ester was first dispersed in the water. The dimethylol urea curing agent was thereupon added to the dispersion immediately prior to the time the formulation was used for the bonding of a variety of substrates. In each case, the formulation yielded satisfactory, rapid setting bonds.

*Example II*

This example illustrates the preparation of a typical adhesive formulation of this invention which, in this case, also contained a protective colloid. It further illustrates the high degree of water resistance exhibited by the bonds derived from the adhesive formulations of this invention as well as their superiority when compared with conventional starch based adhesives.

The various adhesive formulations prepared in this example are set forth in the following table:

| | Parts | |
|---|---|---|
| | Form. #1 | Form. #2 |
| Water | 60 | 60 |
| Raw corn starch | 37 | |
| Acetoacetate ester of corn starch containing 5%, by weight, of acetoacetyl groups | | 37 |
| Pre-gelatinized corn starch | 3 | 3 |
| Aqueous solution containing 30%, by weight, of dimethylol urea | | 3 |

In preparing these formulations, the pre-gelatinized corn starch was first completely dissolved in the water whereupon the raw starch or the acetoacetate ester was dispersed therein. The dimethylol urea curing agent was added to Formulation 2 immediately prior to its utilization.

In order to illustrate the excellent water resistance of the bonds derived from these adhesive formulations, the following test procedure was utilized:

A two ply laminate was prepared by applying a 6 mil wet film of the adhesive formulation to the surface of a 1" x 1" x 6" section of pine board. Another similar section was placed in face-to-face contact with the latter adhesive coated section. A radio frequency current of 5000 radiant watts/ft.$^2$/sec. was passed through the laminate for a period of 10 seconds in order to cure the adhesive. The thus bonded laminate was then immersed, for 24 hours, in water which was at a temperature of about 25° C. After this immersion period, the laminate was examined for deterioration of the glue line with the results of the test procedure being expressed in terms of percentage of the total glue line, i.e. the entire outer perimeter of adhesive between the two strata of the laminate, which has undergone failure. For example, the above described test specimens had a 14" glue line so that a percent failure of 50% indicates that 7" of the glue line has disintegrated following immersion of the specimen under the above described conditions. It should be noted that a value in excess of 20% failure is indicative of poor water resistance on the part of the bonds derived from the adhesive formulation utilized in preparing the laminate being tested.

Test samples bonded with Formulations #1 and #2 as well as with the adhesive formulation prepared in Example I, hereinabove, were submitted to the above described test procedure. The results are presented in the following table:

Formulation Number as prepared in Example I — Percent, delamination
1 ---------------------------------------- 0
2 ---------------------------------------- 100
  ---------------------------------------- 5

It can be readily seen from these results that the adhesive compositions of this invention, i.e. the first and third in the above table, exhibit superior water resistance when compared with a conventional starch based adhesive, i.e. the second formulation in the above table.

*Example III*

This example illustrates the necessity for maintaining the concentration range of acetoacetyl groups in the acetoacetate starch esters utilized in this invention within the prescribed limits.

The formulations presented in the following table were prepared by means of the procedure set forth in Example II, hereinabove. Their water resistance characteristics, which also appear in the following table, were determined by means of the testing procedure set forth in the latter example.

|  | Parts | | | | |
|---|---|---|---|---|---|
|  | Form. 1 | Form. 2 | Form. 3 | Form. 4 | Form. 5 |
| Water | 60 | 60 | 60 | 60 | 60 |
| Acetoacetate ester of corn starch containing 2%, by weight, of acetoacetyl groups | 37 | | | | |
| Acetoacetate ester of corn starch containing 3%, by weight, of acetoacetyl groups | | 37 | | | |
| Acetoacetate ester of corn starch containing 10%, by weight, of acetoacetyl groups | | | 37 | | |
| Acetoacetate ester of corn starch containing 20%, by weight, of acetoacetyl groups | | | | 37 | |
| Acetoacetate ester of corn starch containing 25%, by weight, of acetoacetyl groups | | | | | 37 |
| Pre-gelatinized corn starch | 3 | 3 | 3 | 3 | 3 |
| Aqueous sol'n. containing 30%, by wt., dimethylol urea | 3 | 3 | 3 | 3 | 3 |
| Percent delamination | 35 | 15 | 0 | 10 | (¹) |

¹ Adhesive formulation not tested in view of poor bonding of the lamina resulting from premature crosslinking.

It can be readily seen from the results noted in the above table, that only by the use of acetoacetate starch esters containing concentrations of acetoacetyl groups ranging from about 3 to 20%, by weight, is it possible to obtain adhesive compositions which exhibit superior water resistance characteristics.

*Example IV*

This example illustrates the use of a variety of aldehyde curing agents in the preparation of the adhesive compositions of this invention.

The formulations described in the following table were prepared by means of the procedure set forth in Example II, hereinabove. Their water resistance characteristics, which also appear in the following table, were determined by means of the testing procedure set forth in the latter example.

It can be readily seen from the results noted in the above table, that the adhesive compositions of this invention produce adhesive bonds which exhibit excellent water resistance regardless of the aldehyde curing agent utilized therein.

Summarizing, this invention is thus seen to provide novel adhesive compositions comprising blends of aqueous acetoacetylated starch dispersions and aldehyde curing agents, which are capable of yielding bonds exhibiting excellent water resistance.

Variations may, of course, be made in procedures, proportions, and materials without departing from the scope of this invention which is limited only by the following claims.

What is claimed is:

1. The method for the preparation of an adhesive composition capable of yielding dry films characterized by their water resistance, said method comprising admixing an aldehyde curing agent with an aqueous dispersion of an acetoacetate ester of starch corresponding to the formula

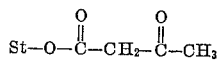

wherein St represents the starch molecule; said acetoacetate ester of starch having an acetoacetyl content of from about 3 to 20%, based on the total weight of said acetoacetate starch ester; said acetoacetate ester being present in said aqueous dispersion in a concentration of from about 20 to 45%, by weight; and, said aldehyde curing agent being present in said adhesive composition in a concentration of from about 0.3 to 10.0%, based on the total weight of said acetoacetate starch ester.

2. The method of claim 1, wherein said aldehyde curing agent is selected from the group consisting of aliphatic aldehydes, aromatic aldehydes, cyclic aldehydes, polymeric aldehydes, methylol compounds, and cyclic ureides.

3. The method of claim 1, wherein a protective colloid is also admixed with said aqueous dispersion of said acetoacetate starch ester.

|  | Parts | | | | | |
|---|---|---|---|---|---|---|
|  | Form. 1 | Form. 2 | Form. 3 | Form. 4 | Form. 5 | Form. 6 |
| Water | 60 | 60 | 60 | 60 | 60 | 60 |
| Acetoacetate ester of corn starch containing 3%, by wt., of acetoacetyl groups | 37 | 37 | 37 | 37 | 37 | 37 |
| Pre-gelatinized corn starch | 3 | 3 | 3 | 3 | 3 | 3 |
| Aqueous solution containing 70%, by wt., of trimethylol phenol | 5 | | | | | |
| Aqueous solution containing 37%, by wt., of formaldehyde | | 1 | | | | |
| Aqueous solution containing 50%, by wt., of furfural | | | 8 | | | |
| Benzaldehyde | | | | 4 | | |
| Hemiformal | | | | | 4 | |
| Dialdehyde starch | | | | | | 3 |
| Percent delamination | 0 | 5 | 10 | 15 | 5 | 10 |

4. The method of claim 3, wherein said protective colloid replaces a maximum of about 25%, by weight, of said acetoacetate starch ester.

5. An adhesive composition capable of yielding dry films which are characterized by their outstanding water resistance, said adhesive composition comprising a mixture of an aldehyde curing agent and an aqueous dispersion of an acetoacetate ester of starch corresponding to the formula $$St-O-\overset{O}{\underset{\|}{C}}-CH_2-\overset{O}{\underset{\|}{C}}-CH_3$$

wherein St represents the starch molecule; said acetoacetate ester of starch having as acetoacetyl content of from about 3 to 20%, based on the total weight of said acetoacetate starch ester; said acetoacetate ester being present in said aqueous dispersion in a concentration of from about 20 to 45%, by weight; and, said aldehyde curing agent being present in said adhesive composition in a concentration of from about 0.3 to 10.0%, based on the total weight of said acetoacetate starch ester.

6. The adhesive composition of claim 5, wherein said aldehyde curing agent is selected from the group consisting of aliphatic aldehydes, aromatic aldehydes, cyclic aldehydes, polymeric aldehydes, methylol compounds, and cyclic ureides.

7. The adhesive composition of claim 5, wherein said aqueous dispersion contains a protective colloid admixed therewith.

8. The adhesive composition of claim 7, wherein said protective colloid replaces a maximum of about 25%, by weight, of said acetoacetate starch ester.

9. A solid substrate coated with a dried adhesive film deposited from an aqueous adhesive composition comprising a mixture of an aldehyde curing agent and an acetoacetate ester of starch corresponding to the formula $$St-O-\overset{O}{\underset{\|}{C}}-CH_2-\overset{O}{\underset{\|}{C}}-CH_3$$

wherein St represents the starch molecule; said acetoacetate ester of starch having an acetoacetyl content of from about 3 to 20%, based on the total weight of said acetoacetate starch ester; said acetoacetate ester being present in said aqueous dispersion in a concentration of from about 20 to 45%, by weight; and, said aldehyde curing agent being present in said adhesive composition in a concentration of from about 0.3 to 10.0%, based on the total weight of said acetoacetate starch ester.

10. The solid substrate of claim 9, wherein said dried adhesive film contains a protective colloid therein.

11. A laminate comprising at least two laminae, said laminae being adhesively bonded with a dried adhesive film deposited from an aqueous adhesive composition comprising a mixture of an aldehyde curing agent and an acetoacetate ester of starch corresponding to the formula $$St-O-\overset{O}{\underset{\|}{C}}-CH_2-\overset{O}{\underset{\|}{C}}-CH_3$$

wherein St represents the starch molecule; said acetoacetate ester of starch having an acetoacetyl content of from about 3 to 20%, based on the total weight of said acetoacetate starch ester; said acetoacetate ester being present in said aqueous dispersion in a concentration of from about 20 to 45%, by weight; and, said aldehyde curing agent being present in said adhesive composition in a concentration of from about 0.3 to 10.0%, based on the total weight of said acetoacetate starch ester.

12. The laminate of claim 11, wherein said dried adhesive film contains a protective colloid therein.

References Cited
UNITED STATES PATENTS

| | | | |
|---|---|---|---|
| 1,685,220 | 9/1928 | Middleton | 260—233.5 |
| 2,468,443 | 4/1949 | Humphner | 106—208 |

ALEXANDER H. BRODMERKEL, *Primary Examiner.*

DONALD J. ARNOLD, *Examiner.*

T. MORRIS, *Assistant Examiner.*